United States Patent [19]

Dederer et al.

[11] Patent Number: 5,166,776
[45] Date of Patent: Nov. 24, 1992

[54] HYBRID VAPOR COOLED POWER LEAD FOR CRYOSTAT

[75] Inventors: Jeffrey T. Dederer, Wilkins Township, Allegheny County; Jiing-Liang Wu, Murrysville Borough, both of Pa.

[73] Assignee: Westinghouse Electric Corp., Pittsburgh, Pa.

[21] Appl. No.: 585,419

[22] Filed: Oct. 20, 1990

[51] Int. Cl.⁵ ............................................ H01L 25/04
[52] U.S. Cl. ........................................ 62/51.1; 505/1; 357/716
[58] Field of Search ............... 357/83, 82; 505/1; 62/51.1

[56] References Cited

U.S. PATENT DOCUMENTS

| | | | |
|---|---|---|---|
| 4,761,556 | 8/1988 | Simpson et al. | 357/83 |
| 4,766,316 | 8/1988 | Jungkman | 357/83 |
| 4,876,413 | 10/1989 | Vermilyea | 62/51.1 |
| 4,895,831 | 1/1990 | Laskaris | 505/1 |
| 4,910,626 | 3/1990 | Collet et al. | 357/83 |
| 4,926,646 | 5/1990 | Dorri et al. | 62/51.1 |
| 4,930,318 | 6/1990 | Brzozowski | 62/51.1 |

FOREIGN PATENT DOCUMENTS

| | | | |
|---|---|---|---|
| 58-98991 | 6/1983 | Japan | 357/83 |
| 59-27583 | 2/1984 | Japan | 357/83 |
| 908199 | 10/1982 | U.S.S.R. | 357/83 |

OTHER PUBLICATIONS

Yamada et al "Critical Current Density of Wire Type Y-BaCu Oxide Superconductor" Jap J. Appl. Phys. vol. 26 No. 5, May 1987 pp. L865-L866.

Robert J. Cava, Superconductors Beyond 1-2-3, Scientific American, Aug. 1990, pp. 42-49.

Tachikawa et al., Potential Methods for the Fabrication of High-$T_c$ Superconductors for Wires and Cables, Proceedings of the IEEE, vol. 75, No. 8, Aug. 1989 pp. 1124-1131.

Richard I. Verga, Superconducting Magnetic Energy Storage and Other Large-Scale SDI Cryogenic Applications Programs, 24th Intersociety Energy Conversion Engineering Conference, IECEC-89 The Institute of Electrical and Electronics Engineers.

*Primary Examiner*—Andrew J. James
*Assistant Examiner*—Sara W. Crane

[57] ABSTRACT

A power lead for a cryostat has high temperature superconducting (HTSC) conductors extending inward toward a pool of liquid cryogen in the cryostat in series with normal conductors extending from the HTSC conductors to outside the cryostat. Tubular shrouds vented to atmosphere direct a flow of cryogen vapor along the HTSC conductors to maintain them superconducting, and along the normal conductors to remove Joule heat and heat leakage along the normal conductors. In one embodiment, a pool of liquid nitrogen maintained within a tubular inner shroud is the principal coolant for the normal conductors. Helium vapor is circulated over the HTSC conductors and is then directed by an outer tubular shroud around the inner tubular shroud to provide additional cooling for the normal conductors. Flexible connectors at one end of each of the HTSC conductors accommodate for individual thermal contractions of these conductors.

8 Claims, 3 Drawing Sheets

HYBRID VAPOR COOLED POWER LEAD FOR CRYOSTAT

BACKGROUND

1. Field of the Invention

This invention relates to electric leads for transmission of electrical power into or out of a cryostat, and in particular it relates to such power leads which are cooled by cryogen vapor.

2. Background Information

Devices utilizing conventional superconducting materials must be operated at very low temperatures, usually very close to absolute zero. The device is typically immersed in a liquid cryogen contained within a cryostat. Helium, which has a boiling point of about 4 K., is commonly used as the cryogen. Interfacing is required for carrying current to and from the device as well as for monitoring controls or instrumentation in the cryostat. Instrumentation leads typically carry very low current and are dimensionally very small so that heat leak into the cryostat along these leads is not a major concern. However, the transmission of relatively large amounts of current as would occur, for instance, in superconducting magnet applications, require that power leads be designed to minimize heat leakage into the cryostat. Presently, the method for accomplishing this is to build power leads that are internally vapor cooled by the vapor that is boiled off from the heat leakage. These leads typically comprise a cylindrical metal tube containing many hollow conductors, such as braided cooper sleeves, through which the vapor passes. This geometry presents a large amount of surface area per unit volume of conductor and results in efficient transfer of heat to the vapor. These leads can be optimized for a minimum heat leak by sizing the length and conduction area so that the heat leak into the lead at the warm end is zero. Thus, the heat conducted to the cryogen is produced only through Joule heating within the lead. This Joule heating can be considerable, however, as in the case of superconducting magnets where the currents could be hundreds to thousands of amperes.

Each watt of heat entering the cryostat requires about 1000 watts to refrigerate. In addition, the liquid helium required for operation at 4 K., a necessary condition for many superconducting devices, is very expensive.

It is therefore the primary object of the present invention to provide an improved power lead for a cryostat.

More particularly, it is an object of the invention to provide an improved vapor cooled power lead which requires boil-off of less cryogen.

It is also an object of the invention to provide an improved vapor cooled power lead for a cryostat using helium as the cryogen in which at least part of the heat load is taken by a less expensive cryogen.

SUMMARY OF THE INVENTION

These and other objects are realized by the invention which is directed to a power lead for a cryostat which includes a first conductor section having conductor members made of a material which is superconducting at a temperature intermediate ambient temperature and the temperature of the cryogen used in the internal chamber of the cryostat. This superconductor section extends inward toward the pool of liquid cryogen in the cryostat and outward to an intermediate point which remains below the intermediate temperature at which the material becomes superconducting. A second conductor section having conductors which remain normal conductors above the intermediate temperature extend outward from the superconductor members to outside the cryostat. Since the conductors of the first section are superconducting, they generate no Joule heating. Joule heating is only produced in the normal conductor in the second outer section of the power lead. A flow of cryogen vapor is maintained over the conductors of the power lead to maintain the conductors of the first section superconducting and to remove heat from the normal conductors of the second section. A tubular enclosure surrounding the conductors and vented to atmosphere produces an efficient flow of cooling cryogen vapor.

The superconducting members are supported at opposite ends by collector plates. The superconductors are soldered to one collector plate and connected to the other, preferably the upper collector plate, by a flexible connector to allow for differences in thermal expansion of the individual superconducting members.

In one embodiment of the invention, the superconducting members are maintained below the critical temperature and the normal conductors are cooled just by vapor of the cryogen in the cryostat. In this embodiment, the tubular enclosure around the normal conductors comprises a single tubular member which guides cryogen vapor from the superconducting section over the normal conductors and out through the vent.

In another embodiment of the invention, the superconducting members are maintained below their critical temperature by vapor of the primary cryogen in the cryostat while the normal conductors are cooled principally by a secondary cryogen with help by vapor from the primary cryogen. The upper section of the tubular enclosure in this embodiment of the power lead includes an inner tubular member surrounding the normal conductors and a concentric outer tubular member forming an annular passage with the inner tubular member. Vapor of the primary cryogen passes over the superconducting members through the upper collector plate, into the annular passage and then out through a primary cryogen vent. The inner tube forms a separate chamber surrounding the normal conductors into which is introduced a pool of the secondary cryogen. This secondary cryogen vaporizes with the vapor passing upward around the normal conductors and out through a separate vent. The inner tube is made of a material with high thermal conductivity so that part of the heat load from the normal conductors is taken by the vapor of the primary cryogen which flows around the inner tube. The outer tube of the upper section and the tube surrounding the superconducting section are made of thermally and electrically insulating material. In a particularly useful power lead in accordance with this embodiment of the invention, helium is used as the primary cryogen and nitrogen as the secondary cryogen.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1B:
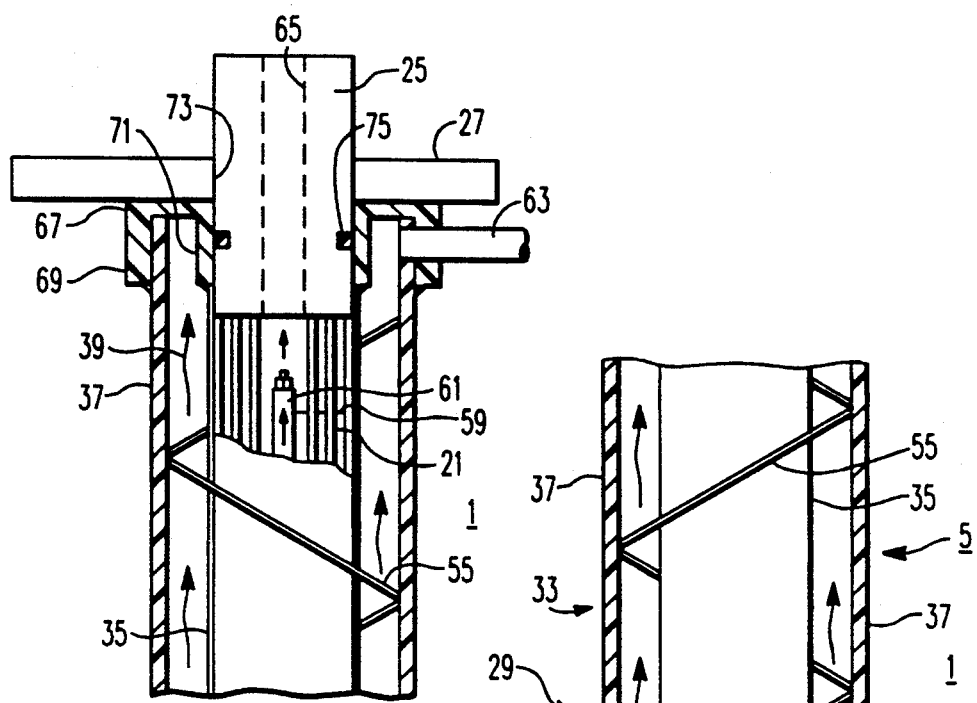
FIGS. 1A and 1B when placed end to end form a longitudinal sectional view of a cryostat power lead in accordance with one embodiment of the invention.
Figure 1A:
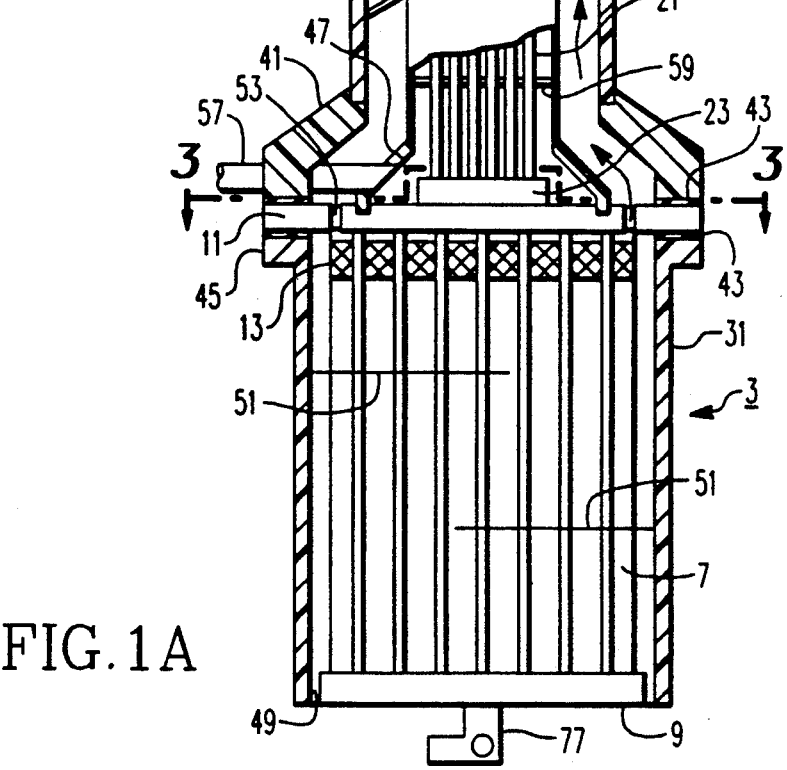

Referring to FIGS. 1A and 1B, a power lead 1 for a cryostat in accordance with the invention includes a superconducting section 3 and a normal conducting section 5. The superconducting section 3 includes a number of superconducting members 7. These superconducting members 7 are made of what is referred to as high temperature superconducting (HTSC) materials. HTSC materials are newly developed materials having a critical temperature (below which they are superconducting) which is substantially above the near absolute zero critical temperature for conventional superconducting materials. HTSC materials include many ceramic materials. A suitable HTSC material for the superconducting members 7 is yttrium barium copper oxide (YBCO) which has a critical temperature of about 90 K. In the exemplary power lead, the YBCO conductors are formed into square rods. Other shapes could also be used and these conductors could be hollow tubes. The YBCO superconducting members 7 are clustered together with spacing between through which, as will be seen, cryogen vapor can flow.

Figure 2:
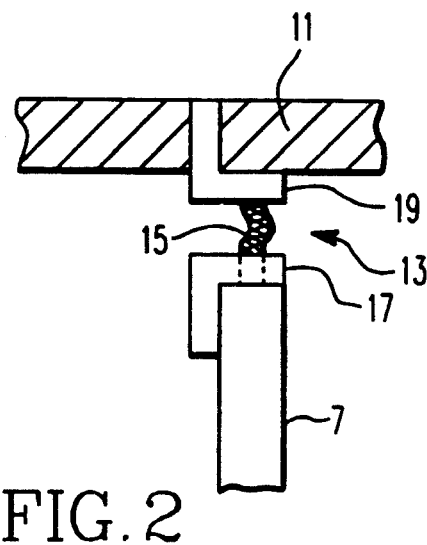
FIG. 2 is a fragmentary view in enlarged scale of a portion of FIG. 1.

The superconducting members 7 are secured in the spaced relation by soldering one end in slots in a lower collector plate 9. Due to variability in the coefficient of thermal expansion of the HTSC material in the individual superconducting members 7, the upper ends of the superconducting members 7 are connected to an upper collector plate 11 through flexible connectors 13. As shown in FIG. 2, these flexible connectors 13 include a section of flexible braided copper conductor 15 which is soldered at its lower end in a bore in one leg of an L-shaped clip 17, which in turn is soldered to the top of a superconducting member 7. The upper end of the braided conductor 15 is similarly soldered to another clip 19 which is soldered into a slot in upper collector plate 11. This arrangement accommodates for the variability in the thermal expansion of the individual superconducting members 7 and precludes the build-up of thermal stresses in these ceramic conductors.

The normal conducting section 5 of the power lead 1 includes an array of normal conductors 21. In the exemplary power lead, these normal conductors 21 are OFHC (oxygen free high conductivity) copper conductors. These copper conductors 21 are soldered in bores in a mounting plate 23 soldered to the upper surface of the upper collector plate 11. The mounting plate 23 as well as the upper and lower collector plates 11 and 9, respectively, are also made of OFHC copper. The upper ends of the copper conductors 21 are soldered in bores in an OFHC copper top plug 25 which has soldered to it an external terminal 27.

The conductors 7 must be cooled below the critical temperature so that they are superconducting and the normal conductors 21 must be cooled to remove Joule heating and conductive heating through these conductors. This cooling is achieved by directing a flow of cryogen vapor over the conductors. Typically, the cryostat in which the power lead 1 is used will have a pool of liquid cryogen at a temperature close to absolute zero. For instance, helium has a boiling point of about 4 K. As mentioned, the HTSC conductors 7 have a critical temperature which is intermediate the near absolute zero temperatures of the cryogen in the cryostat and ambient temperature. For the YBCO conductors of the exemplary power lead, the critical temperature is about 90 K. Vapor from this primary cryogen in the cryostat is used to maintain the temperature of the conductors 7 below their critical temperature. The helium vapor is also used to partially cool the normal conductors 21. However, in accordance with the embodiment of the invention shown in FIGS. 1 through 4, a secondary cryogen is used as the primary vehicle for cooling these normal conductors 21. This secondary cryogen may have a higher boiling point than a primary cryogen, as long as it is below the critical temperature of the superconducting members 7. In the exemplary power lead, this secondary cryogen is liquid nitrogen which has a boiling point of about 77 K.

Cooling vapor is directed over the superconducting conductor 7 and the normal conductors 21 by a tubular enclosure 29. This tubular enclosure includes a lower section 31 comprising a cylindrical tube of an electrically and thermally insulating material such as G-10. An upper section 33 of the tubular enclosure 29 includes an inner cylindrical tube 35 and a concentric outer tube 37, forming with the inner tube 33, an annular passage 39. At the lower end of the outer tube 37 is frusto-conical connector 41. The circular upper collector plate 11 together with Teflon gaskets 43 are clamped between the frusto-conical connector 41 and a radial flange 45 on the cylindrical tube 31. An inner frusto-conical connector 47 seals the bottom of the inner tube 35 to the top of the upper collector plate 11.

Figure 3:
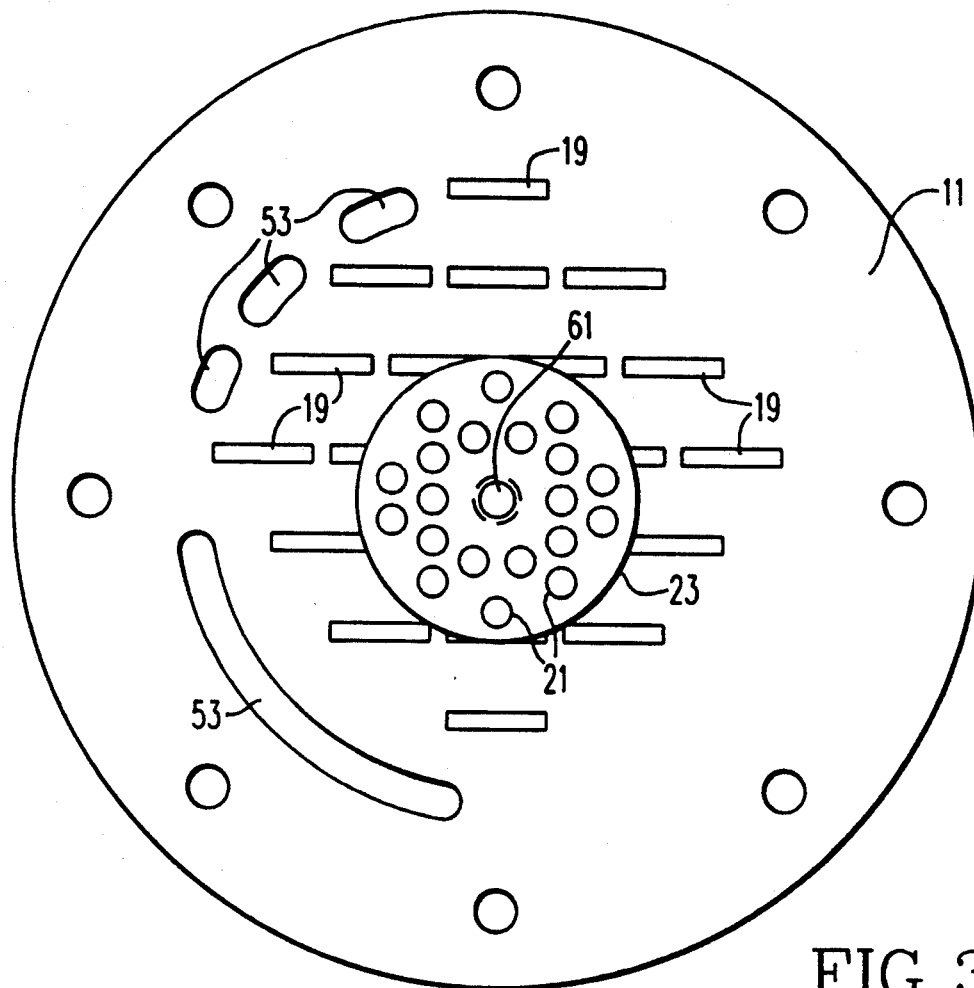
FIG. 3 is a transverse section through the power lead of FIG. 1 taken along line III—III.

The lower collector plate 9 is smaller in diameter than the bore of the cylindrical tube 31 thereby forming an annular gap 49 through which cryogen vapor passes and flows upward around the superconducting members 7. Baffles 51 guide the cryogen vapor in a serpentine path as it flows upward over the superconducting members 7. As best seen in FIG. 3, the primary cryogen vapor passes through arcuate apertures 53 in the upper collector plate and into the annular passage 39 between the inner tube 35 and outer tube 37. The primary cryogen vapor is guided in its upward flow in a spiral path through the annular passage 39 by a helical baffle 55.

A pool of liquid secondary cryogen, which in the exemplary power lead is liquid nitrogen, is introduced into the bottom of the sealed inner tube 35 onto the top of the upper collector plate 11 through a feed tube 57. Joule heating and heat leaking into the cryostat through the normal conductors 21, vaporizes the secondary cryogen. This vapor rises through the inner tube 35 flowing around the normal conductors 21 absorbing the heat therein. Baffles 59 supported by central support rod 61 cause the secondary cryogen vapor to circulate in a serpentine path around the conductors 21. Primary cryogen vapor flowing upward through the annular passage 39 is vented through a vent tube 63 while secondary cryogen vapor is vented from the inner tube 35 through a central vent bore 65 in the top plug 25.

The upper end of the annular passage 39 is sealed by a cap 67 having an outer annular flange 69 cemented to the outer tube 37 and an inner annular flange 71 cemented to the top of the inner tube 35. The inner flange 71 defines a bore 73 in which the top plug 25 is sealed by an O-ring 75.

The device in the cryostat to be served by the power lead 1 is connected to the lead through a terminal lug 77 soldered to the lower collector plate 9. External power leads are connected to the external terminal 27. Power flows between the terminals 27 and 77 through a circuit which includes the top plug 25, the normal conductors 21, mounting plate 23, upper collector plate 11, clips 19, braided conductors 15, clips 17, superconducting members 7 and lower collector plate 9.

The conductors 7 are maintained in the superconducting state by vapor of the primary cryogen which flows through the gap 49 upward around the super conducting members 7 in a path defined by the baffles 51 through the apertures 53 into the annular passage 39 and then out through the vent tube 63. As long as the conductors 7 are maintained below their critical temperature, there is no Joule heating in the lower section of the power lead. Joule heating produced by the flow of current through the normal conductors 21 and conductive heat leaking through these normal conductors is removed principally by vapor of the secondary cryogen. A pool of liquid secondary cryogen is maintained on top of the upper collector plate 11. In the exemplary power lead, the secondary cryogen is nitrogen which has a boiling point of 77 K. This assures, together with vapor of the primary cryogen which in the exemplary lead is helium, that the superconducting members 7 remain below their critical temperature which for the YBCO material used in the exemplary lead is 90 K. Vapor of the secondary cryogen flows upward around the normal conductors 21 and out through the vent opening 65.

The cylindrical tube 31 surrounding the superconducting members 7, the outer tube 37 and the connector 41 are made of a material with low thermal conductivity. A suitable material is G-10. The inner tube 35 is made of a material of good thermal conductivity, such as for example copper so that vapor of the primary cryogen flowing in the annular passage 39 assumes some of the load of removing heat in the normal conductors 21.

It is advantageous to utilize a secondary cryogen such as nitrogen to remove heat from the normal conductors since the nitrogen is much less expensive. In installations such as for example superconducting magnets, the liquid nitrogen is available as it is used in a nitrogen shroud surrounding the vacuum vessel enclosing the magnet. The advantages of using HTSC conductors 7 in the first section of the power lead 1 are not only that no Joule heating is generated in the superconductors, but in addition, these conductors have very poor thermal conductivity and therefore further reduce the heat load on the primary cryogen. It will be noticed that even though a primary cryogen shroud surrounds the secondary cryogen shroud enclosing the normal conductors 21, the overall diameter of this section is less than the diameter of the lower section containing the superconducting conductors. This is because the HTSC material has a critical current density which is lower than the normal operating current density of the OFHC copper used for the normal conductors, and hence, the cross sectional area of superconductor material required is greater.

Figure 4:
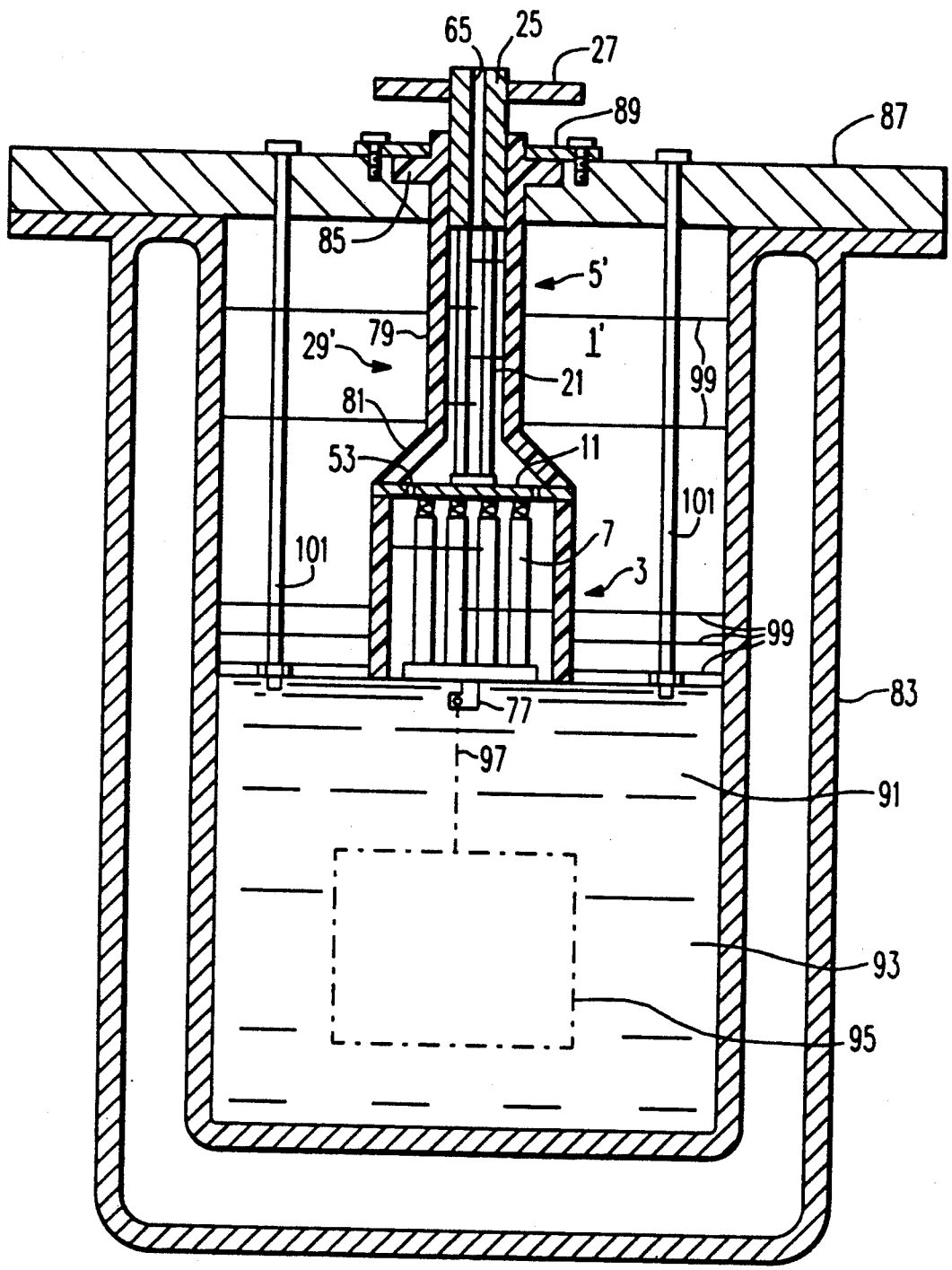
FIG. 4 is a vertical section through a second embodiment of a power lead in accordance with the invention shown mounted in a cryostat.

FIG. 4 illustrates a second embodiment of a power lead made n accordance with the invention in which like parts are identified by like reference characters. Parts in which some features differ from the previously described embodiment are identified with a primed reference character. The superconducting section 3 of the power lead 1' is identical to that of the power lead 1. The normal conducting section 5' differs in that the normal conductors 21 are cooled only by vapor of the same and to cool the superconducting section. Thus, the upper section of the tubular enclosure 29' includes a single cylindrical tube 79 forming a shroud around the normal conductors 21. A frusto-conical connector 81 seals the lower end of the tube 79 to the top of the upper collector plate 11. The cryogen vapor which passes over and cools the superconducting conductors 7 passes through the apertures 53 in the upper collector plate 11 and then flows up through the tube 79 around the normal conductors 21 and passes out through the vent bore 65 in the top plug 25.

FIG. 4 illustrates the power lead 1' mounted in a double walled cryostat 83. A radial flange 85 near the upper end of the tube 79 seats in a counterbore in the lid 87 and retained in place by retaining ring 89 bolted to the lid.

The cryostat 83 has an internal chamber 91 which contains a pool 93 of liquid cryogen, such as liquid helium, in which is immersed a superconducting device 95. The superconducting device 95 is connected to the power lead 1' by a superconducting lead 97 soldered to the terminal lug 77. A similar power lead (not shown) of opposite polarity is also connected to the superconducting device 95.

While the lid 87 of the cryostat is made of a material with low emissivity such as stainless steel, heat radiated by the lid causes some of the liquid cryogen to vaporize resulting in a temperature gradient in the upper section of the chamber 91 of the cryostat 83. The superconducting section 3 of the power lead 1' extends downward toward the pool of liquid cryogen into a region which is at a temperature below the critical temperature of the superconducting members 7. The upper end of the superconducting section 3 extends upward to an intermediate point which remains below the critical temperature. A flow of cryogen vapor is created over the conductors by the vented path through the tubular enclosure. Thus, the cryogen vapor which is still below the critical temperature of the superconducting members 7 as it passes through the upper collector plate 11 passes over the normal conductors 21 and cools them as well. The length of the normal conductors 21 and the flow of cryogen vapor are selected such that the heat flow at the top of the power lead 1' is zero. In order to reduce the radiation heat load on the cryogen, a series of radiation barriers 99 are suspended at spaced locations below the lid 87 by support rods 101. These radiation barriers are sheets of material with a low emissivity such as aluminum.

While the invention has been shown in FIG. 4 as applied to a cryostat in the form of an open vessel covered by a lid, it will be appreciated by those skilled in the art that the power leads of the invention can be applied to other cryogenic apparatus such as superconducting coils where the power leads would penetrate through the walls of the vacuum vessel containing the superconducting magnet and also through any heat shrouds surrounding the vacuum vessel. Since such apparatus commonly includes a nitrogen shroud, so that liquid nitrogen which could conveniently serve as the second cryogen, is readily available, the power lead 1 illustrated in FIGS. 1A and 1B would be especially appropriate for such installations.

While the superconducting and normal conductors in the exemplary power leads are shown as solid conductors, either or both of these sets of conductors could alternatively be hollow conductors through which all or some of the cooling vapor is directed.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A vapor cooled power lead for penetrating a cryostat having a cryogen chamber containing a liquid primary cryogen at a predetermined temperature to carry power at a given power level, said power lead comprising:

a first conductor section including first conductor members composed of a copper oxide ceramic material which is superconducting below a temperature intermediate said predetermined temperature and ambient temperature and at said given power level, said first conductor and outward to an intermediate point which remains below said intermediate temperature, and a first collector plate adjacent first ends of said first conductor members extending toward said liquid cryogen, a second collector plate adjacent second ends of said first conductor members at said intermediate point, and means electrically connecting said first and second ends of said first conductor members to said first and second collector plates respectively, said electrically connecting means comprising for at least one of said ends of said first conductor members flexible electrical connector means;

a second conductor section including second conductor members which are normal conductors above said intermediate temperature extending outward from said first conductor members to outside said cryostat; and flow directing means directing flows of cryogen vapor around said first and second conductor members sufficient to maintain said first conductor members below said intermediate temperature and to absorb Joule heating of and conductive heating through said second conductor members, said flow directing means comprising a first tubular section surrounding said first conductor section, a second tubular section surrounding said second conductor section and interconnected with the first tubular section, said second tubular section including an inner tubular member surrounding said second conductor members and an outer tubular member surrounding said inner tubular member and forming an annular passage therebetween, said annular passage being connected to said first tubular section for flow of said primary cryogen vapor from the first tubular section through said annular passage, said power lead further including means introducing into said inner tubular member a secondary cryogen having a temperature above the predetermined boiling point of said primary cryogen but not above said intermediate temperature, and wherein said second cryogen vaporizes and flows over said secondary conductor means, and vent means including first vent means venting primary cryogen vapor from said annular passage and second vent means venting secondary cryogen vapor from the inner tubular member, and wherein said second conductor plate extends radially between said first and second tubular sections, said second conductor plate having passages therethrough through which primary cryogen vapor passes from said first tubular section to said annular passage.

2. A vapor cooled power lead for penetrating a cryostat having a cryogen chamber containing a liquid primary cryogen at a predetermined temperature to carry power at a given power level, said power lead comprising:

a first conductor section including first conductor members composed of a copper oxide ceramic material which is superconducting below a temperature intermediate said predetermined temperature and ambient temperature and at said given power level, said first conductor members extending inward toward said liquid cryogen and outward to an intermediate point which remains below said intermediate temperature, and a second conductor section including second conductor members which are normal conductors above said intermediate temperature extending outward from said first conductor members to outside said cryostat; and flow directing means directing flows of cryogen vapor around said first and second conductor members sufficient to maintain said first conductor members below said intermediate temperature and to absorb Joule heating of and conductive heating through said second conductor members, said flow directing means including, tubular enclosure means surrounding said first and second conductor sections, said tubular enclosure means including a first tubular section surrounding said first conductor section and a second tubular section surrounding said second conductor section, said second tubular section including an inner tubular member surrounding said second conductor members and an outer tubular member surrounding said inner tubular member and forming an annular passage therebetween, said annular passage being connected to said first tubular section for flow of primary cryogen vapor from the first tubular section through said annular passage, said power lead including means introducing a secondary cryogen having a boiling point above the predetermined temperature of said primary cryogen but not above said intermediate temperature, into said inner tubular member where vapor of said secondary cryogen flows over said secondary conductor means, and first vent means venting primary cryogen vapor from the said annular passage and second vent means venting secondary cryogen vapor from the inner tubular member.

3. A vapor cooled power lead for penetrating a cryostat having a cryogen chamber containing a liquid cryogen at a predetermined temperature to carry power at a given power level, said power lead comprising:

a first conductor section including first conductor members composed of a copper oxide ceramic material which is superconducting below a temperature intermediate said predetermined temperature and ambient temperature and at said given power level, said first conductor members extending inward toward said liquid cryogen and outward to an intermediate point which remains below said intermediate temperature; and a second conductor section including second conductor members which are normal conductors above said intermediate temperature extending outward from said first conductor members to outside said cryostat; and flow directing means directing a flow of cryogen vapor around said first and second conductor members sufficient to maintain said first conductor members below said intermediate temperature and to absorb Joule heating of and conductive heating through said second conductor members, said flow directing means including tubular enclosure means surrounding said first and second conductor sections, said tubular enclosure means comprising a first tubular section surrounding said second conductor section and interconnected with said first tubular section, and vent means connected to said second tubular section and venting to outside said cryostat cryogen vapor flowing from said cryogen chamber through said first tubular section around said first conductor members and through said second tubular section around said second conductor members, and including baffle means defining extended paths for flow of cryogen vapor through said first and second tubular sections.

4. The power lead of claim 2 wherein said primary cryogen is helium and said secondary cryogen is nitrogen.

5. The power lead of claim 2 wherein said inner tubular member forms a chamber for a pool of liquid secondary cryogen.

6. The power lead of claim 2 wherein said outer tubular member of said second tubular section has an outer diameter no greater than the outer diameter of said first tubular section.

7. The power lead of claim 2 including baffle means in at least one of said first tubular section, said inner tubular member and said annular passage defining an extended path for flow of cryogen vapor.

8. The power lead of claim 7 wherein said baffle means defines in said annular passage a helical path.

* * * * *